United States Patent

[11] 3,543,936

[72] Inventors James William Abson
Cheadle Hulme;
Eric Innes Clark, Cheadle; Ian Malcolm
Gray, Disley, England
[21] Appl. No. 707,112
[22] Filed Feb. 21, 1968
[45] Patented Dec. 1, 1970
[73] Assignee Simon-Carves Limited
Cheadle Heath, Stockport, England
[32] Priority Feb. 23, 1967
[33] Great Britain
[31] No. 8603/67

[54] APPARATUS FOR EFFLUENT TREATMENT
11 Claims, 3 Drawing Figs.
[52] U.S. Cl. .................................................... 210/221,
204/149, 210/10, 210/13
[51] Int. Cl. .................................................... C02c 5/12
[50] Field of Search .......................................... 204/149,
284, 292, 294, 302; 210/10, 44, 221, 13

[56] References Cited
UNITED STATES PATENTS
| | | | |
|---|---|---|---|
| 1,069,169 | 8/1913 | Parker | 210/44-X |
| 1,344,127 | 6/1920 | Greenawalt | 209/164 |
| 1,430,182 | 9/1922 | Peck | 210/44 |
| 2,258,507 | 10/1941 | Hoag | 209/166 |
| 2,334,703 | 11/1943 | Henkel | 210/44 |
| 3,035,992 | 5/1962 | Hougen | 204/149 |
| 3,347,786 | 10/1967 | Baer et al | 210/61-X |

Primary Examiner—Michael E. Rogers
Attorney—Holman, Glascock, Downing & Seebold

ABSTRACT: In the treatment of effluent sludge, electrodes are immersed in the effluent sludge and a potential difference is applied and maintained across them at a low current density sufficient to cause gassing whereby a layer of thickened sludge rises to the surface of the liquor and is removed.

Patented Dec. 1, 1970

INVENTORS
JAMES WILLIAM ABSON
ERIC INNES CLARK
IAN MALCOLM GRAY

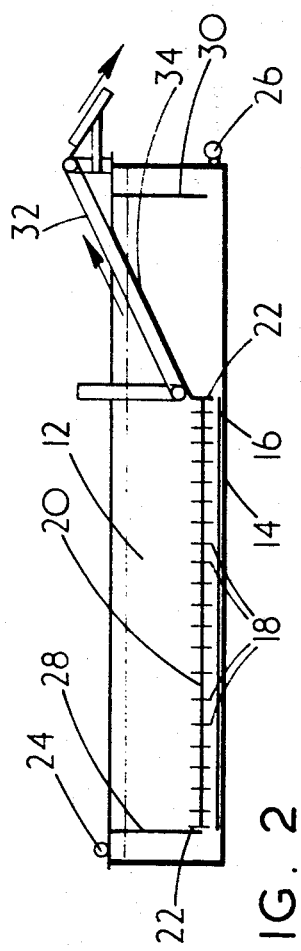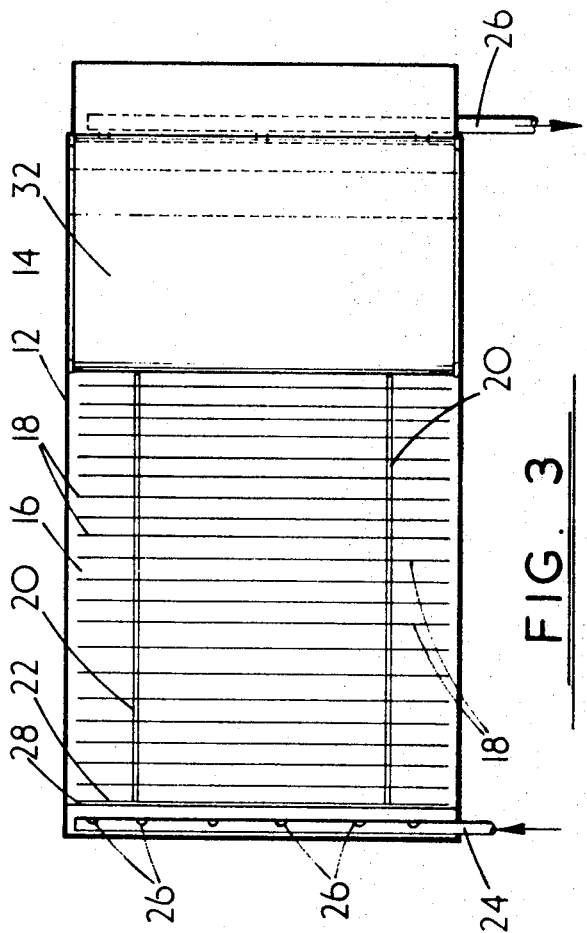

APPARATUS FOR EFFLUENT TREATMENT

This invention is concerned with apparatus for and methods of treatment of effluent.

At times in the treatment of effluents for example municipal sewage and industrial effluents, sludges of high organic content are produced which frequently present a problem, arising at least in part from difficulties in reducing the water content of the sludges to thicken them.

For example, in the treatment of municipal sewage, usually the raw untreated sewage enters primary settling tanks where a sludge of high organic content is settled out; this sludge of high organic content is then digested by the action of anaerobic bacteria and preferably before digestion the sludge is thickened. Clear liquor from the primary settling tanks passes to aeration tanks where it is treated with an activated sludge of high organic contend; the activated sludge is then settled and recycled to the aeration tanks; however surplus activated sludge is produced which is preferably thickened before disposal.

It is an object of the invention to provide an improved method of thickening an effluent sludge of high organic content.

According to one aspect of the present invention there is provided a method of treating effluent sludge comprising the steps of immersing electrodes in effluent sludge applying a potential difference across the electrodes at a low current density, maintaining the current flow so that a layer of thickened sludge is formed, and removing the layer of thickened sludge from the remainder of the liquor.

Advantageously, the method defined above is for the continuous treatment of effluent sludge and includes the steps of passing the effluent sludge continuously into the vicinity of the electrodes and removing separately and continuously the thickened sludge and the remainder of the liquor.

Advantageously, the effluent sludges is treated for an average period of from one to two and one half hours, preferably 1½ to 2 hours and more preferably 1.85 hours.

The current density during treatment may be between 0.003 amp/in2 of cathode (0.00046 amp/cm2 of cathode) and 0.02 amp/in2 of cathode (0.0031 amp/cm2 of cathode), advantageously the current density is between 0.0085 amp/in2 of cathodes (0.0007 amp/cm2 of cathode) and 0.01 amp/in2 of cathode (0.0015 amp/cm2 of cathode), the preferable current density being 0.007 amp/in2 of cathode (0.001 amp/cm2 of cathode).

According to a second aspect of the present invention there is provided apparatus for treating effluent sludge comprising a container, spaced electrodes located in the container and arranged to be immersed in effluent sludge, means for applying and maintaining a potential difference across the electrodes at a low current density sufficient to cause gassing and formation of a layer of thickened sludge, and means for removing the layer of thickened sludge from the remainder of the liquor.

The electrodes may comprise an aluminum cathode and at least one anode containing iron.

Alternatively, the electrodes may be of carbon,

Conveniently the initial solids content of the sludge immediately prior to treatment by the method is not greater than 3 percent by weight. After treatment by the method the thickened sludge may have its water content further reduced by other methods.

Embodiments of the present invention will now be described by way of example, with reference to the accompanying drawings, in which:

FIG. 2 is a schematic side view of a modified form of apparatus according to the present invention and FIG. 3 is a plan view of the apparatus shown in FIG. 2.

Figure 1:
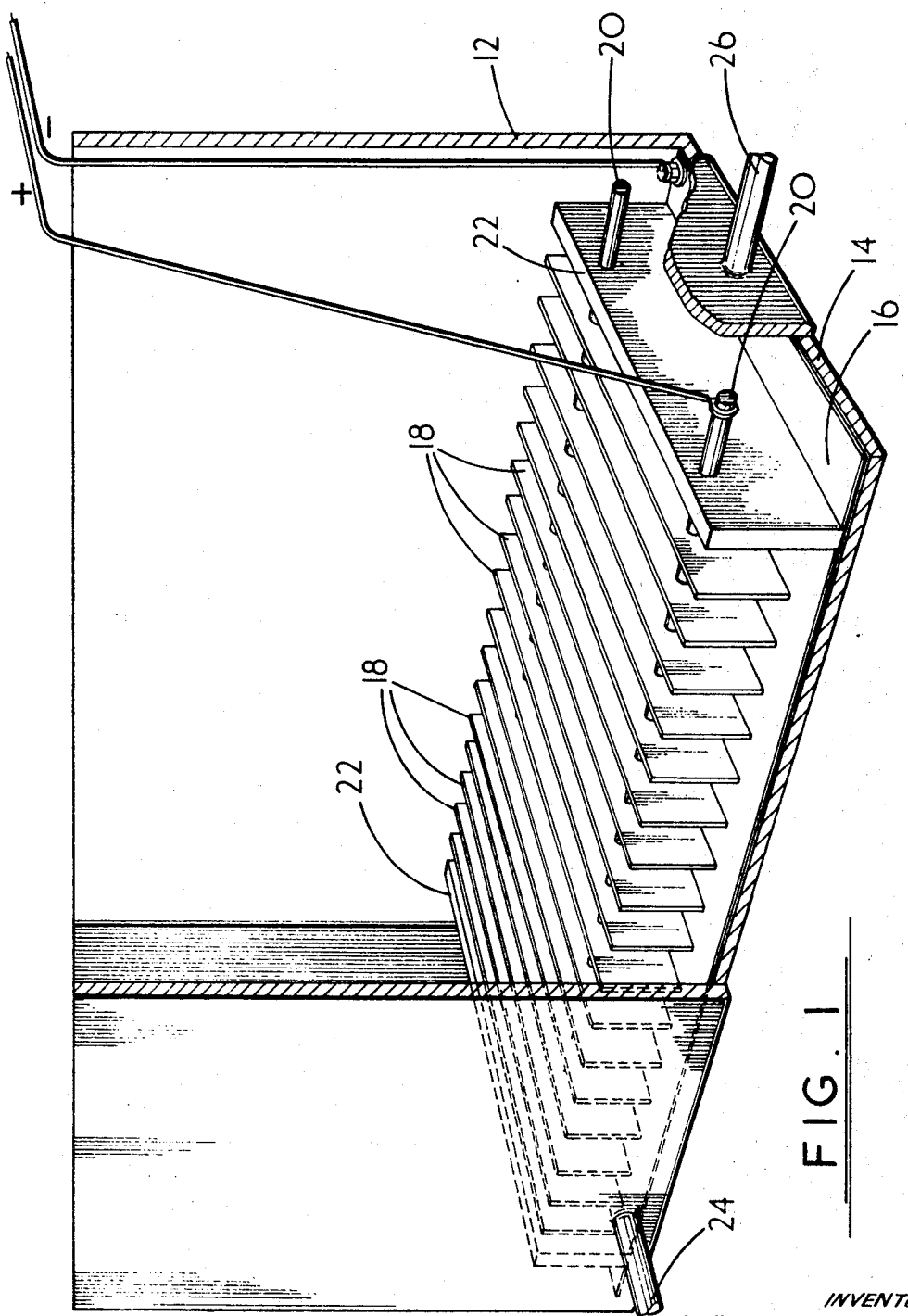
FIG. 1 is a cutaway perspective view of one form of apparatus for treating effluent sludge according to the present invention.

Referring to FIG. 1 the apparatus comprises a tank 12 in which is mounted along a base 14 thereof a horizontal planar aluminum cathode 16. A plurality of vertical, parallel, planar, evenly-spaced, shallow, mild steel anodes 18 are also mounted in the tank 12. The anodes 18 are suspended above the cathode 16 by electrically conductive rods 20 which are mounted in two spaced insulated support members 22.

In the operation of the apparatus an effluent sludge of high organic content is pumped continuously into the tank 12 along a line 24 and a potential difference at a low current density applied between the anodes 18 and the cathode 16 causes separation and sludge and aqueous liquor; the sludge rises to the liquid surface and forms a layer which is removed by removal means (not shown); the clear liquor is pumped out of the tank 12 along a line 26. The liquid level in the tank 12 is near the top of the tank 12 well above the anodes 18.

The apparatus may also be used under batch conditions instead of continuous flow conditions.

The space between adjacent anodes is preferably between 0.05 inches (1.27 cm) and 2 inches (5.08 cm) and the distance between the cathode and the bottom edges of the anodes is preferably between 0.25 inches (0.635 cm) and 1 inch (2.54 cm).

It is believed that the action of the potential difference involves flocculation promoted by hydroxyl ions, the flocs being carried to the liquid surface by gas bubbles produced by electrolysis.

Examples of methods of treating effluent sludge in the apparatus shown in FIG. 1 will now be described.

EXAMPLE I

The apparatus described with reference to the drawings was used with the following parameters:

Cathode: 22.5 inches (57.2 cm) × 11.38 inches (28.9 cm) = 256 in.$^2$ (1655 cm$^2$ Anodes: each 11.375 inches × 1.5 inches = 17 in.$^2$ (110 cm$^2$)

Distance between cathode and bottom edges of anodes: 0.75 inches (1.9 cm)

Voltage: 8.6 volts.

Current: 4 amps.

Current density: 0.016 amps. per square inch of cathode (0.0024 amp/cm$^2$ cathode).

Capacity of tank: 8 gallons (36 litres).

An activated sludge derived from the treatment of municipal sewage was treated in the apparatus under batch conditions for 2 hours. The initial solids content of the sludge before treatment in the apparatus was 0.81 percent by weight and the final solids content after treatment was 4.23 percent by weight.

EXAMPLE II

The apparatus described with reference to the drawing was used with the same parameters as in Example 1.

An activated sludge similar to that of Example 1 was treated in the apparatus under continuous flow conditions with an average residence time of two hours. Clear liquor was pumped from the tank at four/fifths of the flow rate of sludge into the tank. The initial solids content of the sludge was 1.45 percent by weight and the final solids content was 5.25 percent by weight.

EXAMPLE III

The apparatus described with reference to the drawings was used with the same parameters in Example 1.

An activated sludge derived from the treatment of municipal sewage was treated in the apparatus under batch conditions for 2 hours. The initial solids content of the sludge was 0.83 percent by weight and the final solids content was 3.98 percent by weight.

EXAMPLE IV

The apparatus described with reference to the drawing was used to treat, for half an hour under batch conditions, a raw municipal sewage sludge from primary settling tanks; the voltage was 9.5 volts. The initial solids content of the sludge was 0.6 percent by weight and the final solids content was 5.17 percent by weight.

Referring now to FIGS. 2 and 3, the parts of the modified apparatus corresponding to those of the apparatus in FIG. 1 are similarly numbered. In the modified apparatus, the cathode 16 which is of aluminum and the anodes 18 extend for two-thirds of the way along the tank 12. The inlet line 24 is in the form of a transversely extending pipe having a series of orifices 26 therein (FIG. 3) which serve to allow effluent sludge to passed into the tank 12 across the width thereof and a vertically disposed dividing plate 28 serves to direct the effluent sludge entering the tank 12 between the electrodes. The outlet line 26 is in the form of a manifold across the tank 12 which allows the clarified liquor to be removed from the tank across the width thereof and a further vertically disposed dividing plate 30 adjacent the manifold serves to ensure that clarified liquor is removed only from the bottom of the tank 12.

The thickened sludge is removed from the tank 12 by means of a nylon belt conveyor 32 extending across the width of the tank and dipping into the layer of sludge. A shield 34 extending under the conveyor 32 to a point adjacent the end of the anodes 18 remote from the inlet line 24 serves to limit the passage of the thickened sludge beyond the conveyor 32 and also serves to guide any sludge falling off the conveyor back into the region of the electrodes.

In some cases, it is found that a hard deposit containing mainly calcium aluminum and iron ions is formed and adheres to the surface of the cathode and reduces the efficiency of the apparatus. By employing carbon electrodes, particularly a graphite block cathode and a graphite grid anode, the formation of an adherent deposit on the cathode is obviated or mitigated. Alternatively, platinum electrodes may be employed to obviate or mitigate formation of the adherent deposit on the cathode.

Examples of methods of treating effluent sludge in the apparatus shown in FIGS. 2 and 3 will now be described.

EXAMPLE V

Activated effluent sludge taken directly from the main thickener underflow of a sewage treating works was passed into the apparatus in which the cathode area was 3456 in$^2$ (22291 cm$^2$ at a rate of 62 gallons/hour (282 litres/hour), the average percentage of dry solids in the effluent sludge being 0.63 percent.

The depth of effluent sludge was maintained at 9 inches (22.9cm) above the base of the tank and the average residence time in the tank for the effluent sludge was 1.85 hours, during which time a potential difference of 6.7 volts was applied across the electrodes and a current of 25 amps. passed between the electrodes to give a current density of 0.00073amps./in$^2$ of cathode (0.0011amps./cm$^2$ of cathode).

7 gallons/hour (32 litres/hour) of thickened sludge containing an average litres/hour) of 5.53 percent dry solids and 55 gallons/hour (250 litres/hour) of clear underflow liquor containing an average of only 0.023 percent dry solids were removed from the tank.

The percentage recovery of dry solids was 96 percent.

EXAMPLE VI

Activated effluent sludge was passed into the apparatus in which the cathode area was 3456in$^2$ (22291cm$^2$) at a rate of 93 gallons/hour (423 litres/hour), the average percentage of dry solids in the effluent sludge being 0.52 percent. The depth of sludge was maintained at 9 inches (22.9cm) above the base of the tank and the average residence time in the tank for the effluent sludge was 1.24 hours, during which time a potential difference of 4.2 volts was applied across the electrodes and a current of 20 amps. passed between the electrodes to give a current density of 0.0058amps./in$^2$ of cathode (0.0009amps./cm of cathode).

13 gallons/hour (59 litres/hour) of thickened sludge containing an average of 3.5 percent dry solids and 80 gallons/hour (364 litres/hour) of clear underflow liquor containing an average of only 0.04 percent dry solids were removed from the tank.

The percentage recovery of dry solids was 92.8 percent.

EXAMPLE VII

Activated effluent sludge was passed into the apparatus in which the cathode area was 3456in$^2$ (22291cm$^2$) at a rate of 79.6 gallons/hour (362 litres/hour), the average percentage of dry solids in the effluent sludge being 0.57 percent. The depth of sludge was maintained at 9 inches (22.9cm) above the base of the tank and the average residence time in the tank for the effluent sludge was 1.44 hours, during which time a potential difference of 5.5 volts was applied across the electrodes and a current of 25 amps. passed between the electrodes to give a current density of 0.0073amps./in$^2$ of cathode (0.0011amps./cm of cathode).

9.6 gallons/hour (44 litres/hour) of thickened sludge containing an average of 4.46 percent dry solids and 70 gallons/hour (318 litres/hour) of clear underflow liquor containing an average of only 0.038 percent dry solids were removed from the tank.

The percentage recovery of dry solids was 94.1 percent.

EXAMPLE VIII

Activated effluent sludge was passed into the apparatus in which the cathode area was 3456in$^2$ (22291cm$^2$) at a rate of 61 gallons/hour (278 litres/hour), the average percentage of dry solids in the effluent sludge being 0.54 percent. The depth of sludge was maintained at 9 inches (22.9cm) above the base of the tank and the average residence time in the tank for the sludge was 1.88 hours, during which time a potential difference of 3.7 volts was applied across the electrodes and a current of 15 amps. passed between the electrodes to give a current density of 0.0044amps./in$^2$ of cathode (0.00067amps./cm of cathode).

6 gallons/hour (28 litres/hour) of thickened sludge containing an average of 5.2 percent dry solids and 55 gallons/hour (250 litres/hour) of clear underflow liquor containing an average of only 0.033 percent dry solids were removed from the tank.

The percentage recovery of dry solids was 94.5 percent.

EXAMPLE IX

Activated effluent sludge was passed into the apparatus in which the cathode area was 3456in$^2$ (22291cm$^2$) at a rate of 89.5 gallons/hour (407 litres/hour), the average percentage of dry solids in the effluent sludge being 0.05 percent. The depth of sludge was maintained at 13 inches (33cm) above the base of the tank and the average residence time in the tank for the sludge was 1.85 hours, during which time a potential difference of 4.9 volts was applied across the electrodes an a current of 17.5 amps. passed between the electrodes to give a current density of 0.0051amps./in$^2$ of cathode (0.00079amps./cm$^2$ of cathode).

9.5 gallons/hour (43 litres/hour) of thickened sludge containing an average of 4.5 percent dry solids and 80 gallons/hour (364 litres/hour) of clear underflow liquor containing an average of only 0.018 percent dry solids were removed from the tank.

The percentage recovery of dry solids was 96.9 percent.

We claim:

1. Apparatus for treating effluent liquor containing organic solids, comprising a container, spaced upper and lower electrodes of extended area located adjacent the base of the container and arranged to be immersed in the effluent liquor, inlet means extending across substantially the width of the electrodes at one end thereof so as to allow the effluent liquor to be passed continuously into the container and across the width of the electrodes, a dividing plate extending across the width of the container and being spaced above the bottom of the container so as to define a passage which directs the effluent liquor from the inlet means between the electrodes, means for applying and maintaining a potential difference across the electrodes at a low current density sufficient to cause gassing and formation of a layer of thickened organic solids, and an inclined conveyor disposed at the opposite end of th the electrodes to the inlet means, the lower end of the conveyor, in use, being immersed in the effluent liquor so that the thickened organic solids can be continuously removed from the container.

2. Apparatus as claimed in claim 1, wherein an outlet is provided below the inclined conveyor for removing continuously the remainder of the effluent liquor, from which thickened organic solids have been removed, the outlet being disposed across the width of the container.

3. Apparatus as claimed in claim 1, wherein the electrodes comprise a cathode in the form of a plate in the base of the container and at least one anode spaced above the cathode.

4. Apparatus as claimed in claim 3, wherein the anode is in the form of a plurality of spaced plates connected together and supported on electrically conductive rods.

5. Apparatus as claimed in claim 3 wherein the spacing between the cathode and anode is in the range 0.25 — 1 inch (0.635 — 2.54 cm.).

6. Apparatus as claimed in claim 3 wherein the cathode is of aluminum and the or each anode contains iron.

7. Apparatus as claimed in claim 1 wherein the electrodes are of carbon.

8. Apparatus as claim in claim 1 wherein the electrodes are of graphite.

9. Apparatus as claimed in claim 1 for the continuous treatment of effluent sludge, wherein there is provided an inlet through which effluent sludge can be continuously introduced into the container, an outlet by means of which the said remainder of the liquor can be continuously removed from the container, and continuously operable means for removing the layer of thickened sludge from the remainder of the liquor.

10. Apparatus as claimed in claim 9, wherein the continuously operable means is a continuous conveyor.

11. Apparatus as claimed in claim 9 wherein the inlet is adapted to allow effluent sludge to be introduced into one end of the container across the width thereof and the outlet is arranged to allow the said remainder of the liquor to be removed from the other end of the container across the width thereof.